US010471394B2

(12) United States Patent
Thom et al.

(10) Patent No.: US 10,471,394 B2
(45) Date of Patent: Nov. 12, 2019

(54) ELECTRON BEAM INDUCED MODIFICATION OF MEMBRANES BY POLYMERS

(71) Applicant: Sartorius Stedim Biotech GmbH, Goettingen (DE)

(72) Inventors: Volkmar Thom, Goettingen (DE); Bjoern Hansmann, Goettingen (DE); Tobias Foster, Cologne (DE)

(73) Assignee: Sartorius Stedim Biotech GmbH (DE)

( * ) Notice: Subject to any disclaimer, the term of this patent is extended or adjusted under 35 U.S.C. 154(b) by 0 days.

(21) Appl. No.: 14/625,872

(22) Filed: Feb. 19, 2015

(65) Prior Publication Data
US 2015/0157986 A1    Jun. 11, 2015

Related U.S. Application Data

(62) Division of application No. 13/139,534, filed as application No. PCT/EP2009/008866 on Dec. 11, 2009, now Pat. No. 9,045,602.

(30) Foreign Application Priority Data

Jan. 16, 2009   (DE) ........................ 10 2009 004 848

(51) Int. Cl.
*B05D 3/06* (2006.01)
*B01D 67/00* (2006.01)
*B01D 69/02* (2006.01)
*C08J 7/12* (2006.01)
*B01D 69/12* (2006.01)
*B01D 71/08* (2006.01)
*B01D 71/22* (2006.01)
*B01D 71/38* (2006.01)
*B01D 71/68* (2006.01)

(52) U.S. Cl.
CPC ..... *B01D 67/0088* (2013.01); *B01D 67/0093* (2013.01); *B01D 69/02* (2013.01); *B01D 69/125* (2013.01); *B01D 71/08* (2013.01); *B01D 71/22* (2013.01); *B01D 71/38* (2013.01); *B01D 71/68* (2013.01); *B05D 3/068* (2013.01); *C08J 7/123* (2013.01); *B01D 2323/02* (2013.01); *B01D 2323/30* (2013.01); *B01D 2323/34* (2013.01); *B01D 2323/36* (2013.01); *Y10T 428/249953* (2015.04)

(58) Field of Classification Search
CPC .... B01D 67/0093; B01D 69/02; B01D 69/12; B01D 71/08; B01D 71/22; B01D 71/38; B01D 71/68; B05D 3/068; C08J 7/123
See application file for complete search history.

(56) References Cited

U.S. PATENT DOCUMENTS

| | | | |
|---|---|---|---|
| 3,445,272 A | 5/1969 | Newton | |
| 4,193,138 A * | 3/1980 | Okita | A61F 2/06 427/2.31 |
| 4,618,533 A | 10/1986 | Steuck | |
| 4,698,388 A | 10/1987 | Ohmura et al. | |
| 4,944,879 A | 7/1990 | Steuck | |
| 5,049,275 A * | 9/1991 | Gillberg-LaForce | B01D 61/38 210/500.27 |
| 5,098,569 A * | 3/1992 | Stedronsky | B82Y 30/00 210/500.29 |
| 5,171,264 A | 12/1992 | Merrill | |
| 5,229,045 A * | 7/1993 | Soldani | A61L 27/14 264/310 |
| 5,290,548 A | 3/1994 | Goldberg et al. | |
| 5,629,084 A | 5/1997 | Moya | |
| 5,928,792 A * | 7/1999 | Moya | B01D 67/0088 428/422 |

(Continued)

FOREIGN PATENT DOCUMENTS

| | | |
|---|---|---|
| EP | 1 390 087 | 7/2006 |
| EP | 1 381 447 | 1/2007 |
| EP | 2 387 453 | 11/2014 |
| JP | 07-275672 | 10/1995 |
| JP | 2002-233568 | 8/2002 |
| WO | 2005/002712 | 1/2005 |
| WO | 2005/077500 | 8/2005 |

OTHER PUBLICATIONS

Doctoral thesis by R. Tischer, "Modifizierung von Membranoberflaechen zur Verbesserung der Blutkompatibilitaet"—Jun. 4, 2008, pp. 1-146.

*Primary Examiner* — Dah-Wei D. Yuan
*Assistant Examiner* — Kristen A Dagenais-Englehart
(74) *Attorney, Agent, or Firm* — Gerald E. Hespos; Michael J. Porco; Matthew T. Hespos

(57) ABSTRACT

A method for producing a microporous membrane includes providing a microporous starting membrane having outer surfaces and pores with inner surfaces extending between the outer surfaces of the membrane and having a microporous starting membrane permeability. The method impregnates the membrane with an impregnating solution consisting essentially of a solvent and a polymer. The polymer is an organic substance with an average molecular weight of at least 500 g/mol and may be selected from the group consisting of poly(2-ethyloxazoline), polyvinylpyrrolidone-vinyl acetate (PVP-VA) and mixtures thereof. The method then includes irradiating the impregnated membrane with electron beam radiation to provide a crosslinked reaction product constituting a three-dimensional network formed of the microporous starting membrane and the polymer without any decomposition of the microporous starting membrane. The microporous starting membrane permeability is not reduced by more than 10% by fixing the electron beam radiation crosslinked polymer thereto.

17 Claims, No Drawings

(56) References Cited

U.S. PATENT DOCUMENTS

| | | |
|---|---|---|
| 6,039,872 A | 3/2000 | Wu et al. |
| 6,509,098 B1 | 1/2003 | Merrill et al. |
| 6,616,982 B2 | 9/2003 | Merrill et al. |
| 7,067,058 B2 | 6/2006 | Yeh et al. |
| 2001/0055812 A1 | 12/2001 | Mian et al. |
| 2003/0148017 A1* | 8/2003 | Tuominen ............ A61M 1/3672 427/2.1 |
| 2006/0157404 A1 | 7/2006 | Mulletle et al. |
| 2008/0014498 A1* | 1/2008 | Ogawa .................. H01M 4/131 429/149 |
| 2009/0098359 A1* | 4/2009 | Waller, Jr. ................. C08J 7/18 428/308.4 |
| 2009/0191357 A1* | 7/2009 | Moore ............... B01D 67/0093 427/551 |

* cited by examiner

ELECTRON BEAM INDUCED MODIFICATION OF MEMBRANES BY POLYMERS

CROSS-REFERENCE TO RELATED APPLICATIONS

This application claims the benefit of priority to U.S. application Ser. No. 13/139,534, filed Jun. 14, 2011, which claims priority to PCT Application No. PCT/EP2009/008866, filed Dec. 11, 2009, the disclosures of which are incorporated herein in their entirety.

BACKGROUND OF THE INVENTION

1. Field of the Invention

The present invention relates to a method for producing a microporous membrane on whose surface an electron beam radiation crosslinked polymer is fixed, comprising the steps of providing a microporous starting membrane, impregnating the membrane with an impregnating solution comprising a solvent and also a polymer dissolved or dispersed therein to provide an impregnated membrane, and irradiating the impregnated membrane with electron beam radiation to provide a microporous membrane on whose surface the electron beam radiation crosslinked polymer is fixed, and also to a microporous membrane produced by this method.

2. Description of the Related Art

It is usually desirable, for the practical applications of membrane filters, that the filter material be mechanically, thermally and chemically stable and insoluble in common (organic) solvents. This is why polymers are frequently used as filter materials even though their surface properties, such as wettability with water or unspecific binding (of proteins for example), are not in line with the requirements in the later use. To improve the surface properties of membrane filters produced using these polymers, different methods had been developed over recent decades to permanently modify the membrane surfaces. Owing to the need for the modification to be permanent, simply impregnating the membrane with a solution, say, of a hydrophilic polymer (to hydrophilicize a hydrophobic polymeric membrane) is out of the question, since this hydrophilic polymer is readily washed back off the membrane. U.S. Pat. No. 4,698,388 discloses polymeric materials coatable with a block copolymer which can be synthesized, in the presence of a polymeric peroxide, from two varieties of vinyl monomers where the polymer of one of the two varieties of vinyl monomers is homogeneously dispersible in the polymeric materials and the other variety forms hydrophilic homopolymers. The durability of the hydrophilic modification, for example characterized by the antistatic properties or the electrical surface resistivity, is only tested under mild conditions, i.e., by rinsing with city water at room temperature for two hours, nothing else is said about the permanence of the hydrophilic modification on the polymeric material. US-A-2003/148017 discloses the modification of hydrophobic dialysis membranes based on poly(ether) sulfone by adsorption of copolymers having hydrophobic polypropylene oxide (PPO) segments and having hydrophilic polyethylene oxide (PEO) segments, the washoff of which from the membrane into the dialyzate solution is unconcerning in hemodialysis, but undesirable in sterile filtration.

To permanently modify membrane filters made of polymers having hydrophobic surfaces a priori unsuitable for certain filtration processes, U.S. Pat. No. 4,618,533 proposes impregnating porous hydrophobic crude membranes based on poly(ether) sulfone or polyvinylidene fluoride with a solution of a monomer (hydroxyalkyl or aminoalkyl acrylates) and of an initiator, and then to initiate the polymerization of the monomer through energy supply, for example by heating (thermal initiation) or UV irradiation (using a photoinitiator). The polymerization produces long-chain crosslinked chains of polymer in the interior of the porous matrix which are not washable off the membrane and are also partly grafted onto the membrane, effecting a permanent modification. Owing to the toxicity and carcinogenic effect of the monomers used (acrylates, methacrylates and other vinylic monomers), however, the difficulty with these processes is to ensure that no unconverted monomers remaining in the membrane after the modification be released in later use, for example into the filtrate. Reducing the level of extractables to what is permitted generally requires a high-, cost- and time-intensive rinsing effort after the modification. In addition, the modification process requires toxic and carcinogenic compounds to be handled in the course of the manufacturing process and for the waste and residue materials generated in the course of that process to be disposed of. Hence using these compounds appears to be dubious not just from cost, environmental and health viewpoints but also, more particularly, against the background of ever stricter environmental regulations ("Reach").

One alternative to using the frequently toxicologically concerning monomers mentioned is to use so-called prepolymers, i.e., polymers containing reacting functional groups. U.S. Pat. No. 5,629,084 discloses impregnating base membranes of polyvinylidene difluoride, polytetrafluoroethane, polyethene and polypropylene with a solution of prepolymers using a free-radical initiator to initiate the polymerization. A crosslinker is not used, the crosslinking of the prepolymers based on polyvinyl alcohols, polyvinylamines, polyacrylic acids and polyvinylpyrrolidone and the grafting thereof to the membrane surface being induced through energy supply, specifically heat supply in the case of thermal initiators or UV irradiation in the case of photoinitiators. This process is disadvantageous in that it utilizes peroxide- and persulfate-based initiators in considerable proportions between 10 and 30 weight percent during production, since these or their degradation products (alkali metal sulfates, alkali metal phosphates and benzoic acid derivatives) have to be removed off the modified membrane material as waste materials by extraction after the modifying process. Furthermore, the production process is limited to thermal energy and UV radiation as radiation modes since electron beam radiation destroys the base membrane material and thus fails to provide any modification (cf. U.S. Pat. No. 5,629,084 column 3, lines 53 to 56). This finding from the prior art is supported by the fact that, in all exemplary embodiments, the modification of the starting membrane by crosslinking the prepolymer is only performed by heating or by UV irradiation, necessitating the use of, respectively, a free-radical initiator or a photoinitiator (cf. Examples 1-11 of U.S. Pat. No. 5,629,084).

One alternative to using initiators is to initiate the polymerization using electron beam radiation. For this, the membrane to be modified is impregnated with a solution containing reactive organic molecules, for example monomers derived from acrylic acid derivatives, and then exposed to electron beam radiation which initiates the reaction of the monomers. For modifying membranes, this process is described in U.S. Pat. No. 4,944,879, EP-B-1 390 087, EP-B-1 381 447 and U.S. Pat. No. 7,067,058. The impregnating solutions described frequently further contain crosslinkers, i.e., doubly or generally multiply functional monomers (cf. U.S. Pat. No. 4,944,879, EP-B-1 390 087, EP-B-1 381 447, WO-A-2005/077500) or mixtures of two or more monomers and crosslinkers (EP-B-1 390 087, EP-B-1 381 447 and U.S. Pat. No. 7,067,058). However, these processes likewise utilize toxic monomers such as acrylates, acrylamides and other vinylic monomers. Moreover, the crosslinkers are likewise toxic and/or caustic compounds. The problem of the extractable toxic constituents of the modified membrane which have to be removed in costly and inconvenient cleaning steps after membrane production is not solved in this way. Similarly, the variants of the thermally induced modification with a homopolymer and crosslinker (WO-A-2005/077500) or with an oligomer, with a monomer and optionally with a crosslinker utilize concerning low molecular weight organic compounds, while U.S. Pat. No. 6,039,872 discloses hydrophilic membranes obtainable from a hydrophobic poly(ether) sulfone membrane and a crosslinkable polyalkylene glycol diacrylate and also a hydrophilic monoacrylate. In addition, the processes described are complex and cost-intensive on account of the large number of different starting materials.

A further variant of this modification method of electron beam induced polymerization describes polymeric interlayers which are grafted onto the membrane surface, the polymeric interlayer being in turn grafted with a further modifying layer that endows the final membrane with hydrophilic properties. U.S. Pat. Nos. 6,509,098 and 6,616,982 disclose membranes and their methods of making, wherein the modification of hydrophobic base membranes is effected using an intermediary polymeric layer which can be generated from (meth)acrylic acid monomers by electron beam irradiation. This intermediary polymeric layer subsequently has applied to it, by electron beam induced grafting of polyethylene oxide, a hydrophilic, second polymeric layer. The intermediary polymeric layer is obtained from toxicologically concerning, monomeric acrylic acid derivatives, and this two-stage process is likewise comparatively costly and inconvenient.

The problem addressed by the present invention is therefore that of providing a microporous membrane that has a durable modification on its surface and does not contain any extractable toxic components, and also that of providing an environmentally friendly method for producing it without using toxicologically concerning starting materials and toxic process-initiating substances.

SUMMARY OF THE INVENTION

More particularly, there is provided a method for producing a microporous membrane on whose surface an electron beam radiation crosslinked polymer is fixed, said method comprising the steps of:
a) providing a microporous starting membrane,
b) impregnating the membrane with an impregnating solution comprising a solvent and also a polymer dissolved or dispersed therein to provide an impregnated membrane, and
c) irradiating the impregnated membrane with electron beam radiation to provide a microporous membrane on whose surface the electron beam radiation crosslinked polymer is fixed.

In the context of the present invention, the microporous membrane is a membrane having pores in the micrometer range. Preferably, the microporous starting membrane has an average pore size in the range from 0.001 to 10 μm.

The microporous starting membrane can consist of any suitable material. Appropriate microporous membranes are known in the prior art. Preferably, the microporous starting membrane consists of a material selected from the group consisting of polysulfone, polyether sulfone, cellulose acetate, cellulose nitrate, polyvinylidene fluoride, polypropene, polyethene, polytetrafluoroethene, polyamide, copolymers thereof and mixtures thereof.

In a preferred embodiment of the inventive method, the thickness of the starting membrane is in the range from 5 to 500 μm, more preferably in the range from 50 to 300 μm and most preferably in the range from 80 to 200 μm.

After the providing of the above-described microporous starting membrane (step a) of the inventive method), step b) of the inventive method is that of impregnating the membrane with an impregnating solution comprising a solvent and also a polymer dissolved or dispersed therein to provide an impregnated membrane.

In the context of the present invention, the impregnating is to be understood as meaning any possible form of contacting the essentially entire surface of the starting membrane with the polymer. Preferably, the impregnating is effected by dipping the starting membrane into the impregnating solution or by spraying the starting membrane with the impregnating solution, which is optionally followed by a step of removing an excess of the impregnating solution from the outer faces of the membrane. If it is advantageous for the impregnating process, a dry starting membrane can first be wetted with a suitable wetting liquid which, in a second step, is exchanged for the impregnating solution. By surface of the starting membrane is meant not only the inner surface, i.e., the pore inside wall faces, but also the outer surface, i.e., the outer faces of the membrane.

The solvent of the impregnating solution can be any suitable solvent. However, it is preferable to select a solvent in which the polymer is soluble or dispersible but which does not attack/dissolve the starting membrane. Moreover, the solvent is preferably selected such that it does not disrupt the crosslinking reaction. The swellability of the starting membrane in the solvent should be taken into account when selecting the solvent. A preferred embodiment of the present invention utilizes a solvent selected from the group consisting of water, alcohols, ketones, hydrofluoroethers and mixtures thereof. Suitable alcohols are for example methanol, ethanol, propanol, isopropanol and butanol. Acetone is an example of a suitable ketone. Particular preference is given to using water or a mixture of water and butanol as solvent. Especially the use of water as solvent can boost the economics of the inventive method as well as its environmental friendliness.

A suitable amount of the polymer is present in the solvent in a dissolved or dispersed state. Suitable adjustment of the concentration of the modifying polymer and of the parameters of the subsequent electron beam irradiation can be used in the inventive method to produce membranes having adjustably varied permeabilities. It is particularly preferable for the treatment not to reduce the permeability by more than 90%, more preferably by not more than 50% and most preferably by not more than 10%. In the context of the present invention, permeability is the volume of water flowing through the membrane at 20° C. per unit membrane area under standardized differential pressure, and is reported in liter/(hour·square meters·bar).

It is therefore preferable for the impregnating solution to contain from 0.01% to 20% by weight of the polymer. It is particularly preferable for the impregnating solution to contain from 0.2% to 5% by weight of the polymer.

The impregnating is typically done for a time sufficient to cover the essentially complete surface of the starting membrane. The impregnating is preferably done for a time in the range from 0.05 to 10 minutes and more preferably for a time in the range from 0.1 to 1 minute. The impregnating time is preferably below one minute in the case of a convective impregnation and in the range from two to 10 minutes in the case of a diffusive impregnation.

Convective impregnation is hereinbelow to be understood as meaning an impregnation wherein any flow of the impregnating solution through the starting membrane is forced, which achieves convective transportation of the polymer into the pores of the starting membrane. The rate-determining step is then virtually only determined by the association constant between the starting membrane and the polymer in the impregnating solution. Diffusive impregnation is hereinbelow to be understood as meaning an impregnation wherein the mass transfer of the polymer in the impregnating solution into the pores of the starting membrane is subject to a diffusion limitation. The diffusion limitation consists in the rate of the adsorption process being determined by the diffusion rate of the polymer into the pores. The diffusion rate is in turn determined by the diffusion coefficient of the polymer, which is very substantially dependent on the size/molecular weight of the polymer.

The polymer used for impregnating can be chosen according to the particular surface properties desired for the microporous membrane to be obtained. When a hydrophilicized membrane surface is desired, a hydrophilic polymer should be used for the modifying. When, by contrast, a hydrophobicized membrane surface is desired, a hydrophobic polymer should be used for the modifying. The hydrophilicity or hydrophobicity of the polymer also dictates the choice of solvent. To produce an anionically or cationically charged membrane, the modifying polymers used can either already bear chargers or exhibit functional groups chemically or physically convertible into cationic or anionic groups. In a particularly preferred embodiment of the invention, these polymers contain for example amine functions differing in the degree of substitution, carboxyl or sulfonic acid groups, or ester or amide functions.

In the context of the present invention, a polymer is an organic substance which has an average molar mass of at least 500 g/mol and is obtainable from at least one variety of an organic starting monomer. A preferred embodiment of the present invention utilizes an impregnating polymer selected from the group consisting of a copolymer, a homopolymer and mixtures thereof. Particular preference is given to using a polymer selected from the group consisting of poly(2-ethyloxazoline), polyethylene oxide (PEO), polypropylene oxide (PPO), hydroxyethylcellulose, dextran, hydroxymethylcellulose, PEO-PPO-PEO triblock copolymers and mixtures thereof. Among the PEO-PPO-PEO triblock copolymers it is particularly Pluronics® from BASF AG, CAS No. 9003-11-6, having the general composition $(PEO)_b$-$(PPO)_a$-$(PEO)_b$, where the indices a and b are in the range of 3-80, which is preferred. Another preferred embodiment utilizes a polymer to modify the starting membrane that is selected from the group of perfluorinated hydrocarbons, charged polymers or chelating polymers.

This is followed in the inventive method by step c) irradiating the impregnated membrane with electron beam radiation to provide a microporous membrane on whose surface the electron beam radiation crosslinked polymer is fixed. The irradiating as per the inventive method produces a crosslinked reaction product which constitutes a three-dimensional network formed from the starting membrane and the polymer, and which forms on the essentially entire inner and outer surface of the membrane obtained. This reaction product is durably fixed on the membrane obtainable according to the inventive method. In the context of the present invention, fixing is to be understood as meaning any covalent and noncovalent attachment of the crosslinked polymer to the entire membrane surface, for example grafting, or the application of a polymeric layer which lines the entire membrane surface as a coherent network without the polymeric layer in turn needing to have been grafted to the membrane surface.

The irradiating is typically effected using an energy dose sufficient to fix the polymer on the surface of the membrane. The kinetic energy of the electrons used for modifying can be adjusted via the acceleration voltage of the electron beam source such that the energy dose of the irradiation forms a homogeneous distribution throughout the penetrated membrane, or that a gradient over the cross section of the membrane is produced. Simultaneous or sequential irradiation from both sides can be used to produce further, more complex depth dose profiles in the membrane, which are adjustable for individual embodiments irrespective of other parameters of the process. In a preferred embodiment of the present invention, the electron beam irradiating is effected at a dose in the range from 1 to 300 kGy and more preferably at an energy dose in the range from 5 to 200 kGy. It is most preferable to effect the electron beam irradiating at a dose in the range from 25 to 150 kGy. It has been determined that adapting the parameters of the electron beam radiation to the individual material properties of the starting membrane makes it possible to achieve a permanent modification without any prior decomposition of the starting membrane occurring. It has thus been found that, surprisingly and contrary to the findings of U.S. Pat. No. 5,629,084, it is possible to achieve a durable modification of a microporous starting membrane through an electron beam radiation generatable reaction product of a polymer without any prior decomposition of the starting membrane due to the electron beam radiation.

In addition to the acceleration voltage to influence the penetration depth of the electron beam radiation, changing the ambient atmosphere in the irradiating step is possible. The reaction sequence during the irradiating can be influenced by the presence of reactive substances, such as oxygen. Gassing with nitrogen or noble gases and also reactive gases, such as oxygen, can be used to adjust the composition of the ambient atmosphere during the irradiating step. A further way to adjust the atmospheric conditions during the irradiating step is to cover the membrane with suitable foils which substantially limit the diffusion of gases in the process zone into the impregnated membrane.

The irradiating can be effected using a single ply or using a multi-ply pack of membranes, in which case the penetration depth of the electrons can be adapted via the acceleration voltage used.

Optionally, the inventive method prior to said step b) of impregnating further comprises the step of d) pretreating the microporous starting membrane with a prewetting medium. This prewetting can facilitate the subsequent impregnating step, depending on the starting membrane used. Preferably, the prewetter is selected from the group consisting of alcohols, ketones, hydrofluoroethers, hydrocarbons and combinations thereof. Suitable alcohols are for example methanol, ethanol, propanol, isopropanol and butanol. Acetone is an example of a suitable ketone.

In a further preferred embodiment of the present invention, the method after said step c) of irradiating further comprises the steps of e) extracting the microporous membrane on whose surface an electron beam radiation crosslinked polymer is fixed with an extractant to provide an extracted membrane, and f) drying the extracted membrane. In step e), the extractant does not dissolve the material of the final membrane, whereas the unconverted polymer, crosslinked polymer not fixed on the membrane and solvent residues from step b) are dissolved by the extractant. The swellability in the extractant of the membrane present after step c) should be taken into account when selecting the extractant. Preferably, the extractant is selected from the group consisting of water, aqueous acids, aqueous alkalis, alcohols, ketones and combinations thereof. Suitable alcohols are for example methanol, ethanol, propanol, isopropanol and butanol. Acetone is an example of a suitable ketone. Preferably, the extracted membrane is dried at a temperature in the range from 60 to 190° C. for a period ranging from 6 seconds to 120 minutes. This makes it possible to remove the solvent from the membrane within a comparatively short time to obtain a ready-to-use modified membrane.

The inventive method coats the essentially entire surface of the porous starting membrane (i.e., including the pore inside wall faces) with the modifying polymer. Preferably, the inner and outer surface of the membrane is modified as such in the process that the permeability is not reduced by more than 90%, preferably by not more than 50% and most preferably by not more than 10%.

The modifying polymer is not formed in situ, i.e., is not applied to the surface of the starting membrane in the form of monomer units and polymerized by the electron beam irradiation. Rather, the polymer is brought into contact with the starting membrane in solution and then exposed to electron beam radiation. The polymer is thus the starting material for the reaction product which is permanently fixed and crosslinked on the starting membrane by electron beam radiation and which solely or in synergy with the starting membrane, determines the hydrophilic/hydrophobic properties of the membrane produced according to the method of the present invention.

The method of the present invention further has the advantage that it merely needs impregnation and single-stage irradiation to obtain a modified membrane.

The present invention further provides a microporous membrane on whose surface an electron beam radiation crosslinked polymer is fixed, produced by the above-defined method according to the present invention.

The present invention further provides for the use of this microporous membrane as membrane filter in hemodialysis, virus filtration and/or in the sterile filtration of gases and liquids.

The present invention is further elucidated by the non-limiting examples which follow.

EXAMPLES

Methods of Characterization:
Droplet Absorption Time:
A 10 µl drop of water is placed on the dried, modified membrane and the time taken for the drop to be completely absorbed by the membrane.

Soxhlet Extraction:
The modified membrane was Soxhlet extracted for 72 h at a pressure of 1 atm and a temperature of 72° C. using ethanol as extractant.

Permeability
The permeability of the membrane is the volume flow through the membrane per unit area under a standardized differential pressure. What is reported is the permeability of water at 20° C. through the membrane in liters/(hour·square meters·bar).

Protein Binding:
10 mm roundlings die-cut out of the dried, modified membrane were incubated for 1 h in 200 µl of γ-globulin solution (Sigma-Aldrich, concentration 3 mg/ml in 0.05 M KPI buffer (0.05 M potassium phosphate in reverse osmosis water), pH 7) each. The solution was subsequently aspirated off and the roundlings were each extracted three times with 1 ml of the buffer for 10 minutes. Then, the roundlings were each treated with 300 µl of BCA reagent use solution from BCA reagent A (0.886% by weight of 2,2'-biquinoline-4,4'-dicarboxylic acid (bicinchoninic acid), 0.16% by weight of disodium tartrate, 2% by weight of sodium carbonate [anhydrous], 0.95% by weight of sodium bicarbonate in reverse osmosis water) and BCA reagent B (4% by weight of $CuSO_4$ solution in reverse osmosis water), mixed in a ratio of 50:1 immediately before use. The intensity of the discoloration of the solution above the roundling was evaluated with a photometer as absorbance at 595 nm. The concentration of the membrane-bound γ-globulin was determined as interpolation of a series of standards as per D. Burns, A. Zydney, "Effect of Solution pH on Protein Transport through UF Membranes", Biotechnology and Bioengineering, Vol. 64, No. 1, 1999, pp. 27-37.

Surface Tension:
A 10 µl drop of an aqueous sodium chloride or calcium chloride solution or of some other suitable, (non)aqueous liquid of known surface tension was placed onto the dried, modified membrane and the time taken for the drop to wet the membrane in the entire thickness, characterized by a distinct increase in transparency. When the wetting by the drop took less than one second, the wetting was classified as spontaneous. The surface tension of the sodium chloride or calcium chloride solution or of the (non)aqueous liquid, whichever is used, is increased in steps of 1 mN/m and the drop application experiment repeated until wetting is no longer spontaneous. The surface tension of the membrane is equal to the highest surface tension of the solution used which still just provides spontaneous wetting.

General Description of Procedure:
The starting membrane having a thickness in the range from 5 to 500 µm was wetted with a solution of the modifying polymer by impregnation for 0.05 to 10 minutes, the concentration of the polymer in the solution being in the range from 0.01 to 20 weight percent. When the membrane material was not spontaneously wetted by this impregnating solution, a prewetting with a suitable solution which did spontaneously wet the starting membrane material was optionally carried out. Subsequently, this prewetting medium was exchanged for the impregnating solution. After the contacting of the membrane with the impregnating solution, the membrane was placed between two polyethene (PE) foils and excess impregnating solution was displaced from the membrane using a roller or squeezed off between two rubberized rolls. Subsequently, the impregnated membrane was exposed to electron beam radiation (ESI Electrocurtain) using acceleration voltages between 150 to 240 kV and doses in the range from 1 to 300 kGy. The speed at which the material to be irradiated was transported through the irradiation zone was in the range from 1 to 100 m/min. The irradiation zone was inertized with nitrogen. After irradiation, the membrane was extracted with suitable solvents to dissolve unconverted molecules of the modifying polymer. Subsequently, the modified membrane was dried in a drying cabinet and investigated for its properties.

The inventive method of production was used to hydrophilicize membranes composed of polyether sulfone (Sartorius Stedim Biotech GmbH, type 15407, average pore size 0.2 µm, type 15428, average pore size 0.02 µm, type 15404, average pore size 0.8 µm) or of polysulfone (Sartorius Stedim Biotech GmbH, type 14907, average pore size 0.2 µm) with different reaction products obtainable from a polymer by electron beam radiation.

The properties of the modified membranes were investigated after different impregnations ("Imprägn.") and after exposure to different doses of irradiation (dose in kGy). The properties of the membranes were quantified via the droplet absorption time (TASZ in s), the droplet absorption time after Soxhlet extraction (TASZsox in s), the permeability of water at 20° C. (flux in l (liter) per m² of membrane area per hour (h) at 1 bar differential pressure) and also via the unspecific protein binding of γ globulin ("Prot. Bind". in µg of protein per cm² of membrane area). The unspecific protein binding and the surface tension were determined as described under "Methods of characterization".

Durable fixing in the case of the membranes obtained via the method of the present invention was evidenced via a Soxhlet extraction. It was also shown that the reaction product fixed on the microporous membrane is in a cross-linked state by dichloromethane treatment of the membrane obtained via the method of the present invention. In the case of the insoluble residue obtained as gel phase, NMR and IR spectroscopy were used to evidence functional units of the modifying polymer. In contradistinction thereto, the starting membranes were completely soluble in dichloromethane.

1) Poly(2-ethyloxazoline):

The first polymer used was poly(2-ethyloxazoline) (Aquazol® 5), which is a hydrophilic homopolymer from Polymer Chemistry Innovations with a molar mass of 5000 g/mol and a polydispersity in the range from 3 to 4. The impregnating was effected using a solution of Aquazol® 5 in reverse osmosis (RO) water that contained 0.5 weight percent of the homopolymer. The 15407 type membrane was modified as prescribed above under "General description of procedure" (dose 75 kGy (corresponds to 75 kJ/kg)) and had the properties recited in table 1 after extraction with isopropanol (IPA) and water. The reference membrane was merely extracted with IPA and water without having been treated beforehand with impregnating solution and/or electron beam radiation; a further reference membrane was irradiated with water after impregnation, and subsequently extracted with IPA and water:

TABLE 1

| Imprägn. | Dose/ kGy | TASZ/s | Protein binding/ (µg/cm²) | Permeability/ (l/(h * m² * bar) | Surface tension/ (mN/m) | TASZ Soxhlet/s |
|---|---|---|---|---|---|---|
| Aquazol 5, 1% | 75 | 8 ± 1 | 1.1 | 1.10 * 10⁴ | 76* | 7.5 |
| water | 75 | 13 ± 1 | 8.2 | 1.29 * 10⁴ | 72** | 29 ± 3 |
| none | 0 | 24 ± 2 | 9 ± 1 | 1.20 * 10⁴ | 72** | >300 | surface tension was determined with
*aqueous CaCl₂ solution (12.3% by weight of CaCl₂) or
**water It transpired that the modified membrane has a distinctly reduced TASZ compared with the reference membranes, especially after 72 hour Soxhlet extraction with ethanol. Therefore, the starting membrane becomes permanently hydrophilicized by the electron beam induced modification after impregnation with an aqueous solution of poly(2-ethyloxazoline) without prior decomposition of the starting membrane occurring. Moreover, the unspecific protein binding of the membrane is dramatically reduced by this modification. The flux is only minimally altered by the modification.

2) Polyethylene Glycol 4000

The starting membrane of type 15407 was impregnated with a solution of Pluriol® 4000, obtainable from BASF (polyethylene glycol having an average molar mass of 4000 g/mol) in reverse osmosis (RO) water that contained 1.0 percent by weight of the homopolymer. The membrane was modified as prescribed above under "General description of procedure" (dose 75 kGy (corresponds to 75 kJ/kg)) and had the properties recited in table 2 after extraction with isopropanol (IPA) and water. The reference membrane was merely extracted with IPA and water without having been treated beforehand with impregnating solution and/or electron beam radiation; a further reference membrane was irradiated with water after impregnation, and subsequently extracted with IPA and water:

TABLE 2

| Imprägn. | Dose/ kGy | TASZ/ s | Protein binding/ (µg/cm²) | Permeability/ (l/(h * m² * bar) | Surface tension/ (mN/m) | TASZ Soxhlet/s |
|---|---|---|---|---|---|---|
| water | 75 | 13 ± 1 | 8.2 | 1.29 * 10⁴ | 72* | 29 ± 3 |
| none | 0 | 24 ± 2 | 9 ± 1 | 1.20 * 10⁴ | 72* | >300 |
| Pluriol® 4000, 1% | 75 | 10.5 | 3.3 | 0.78 * 10⁴ | 95** | 7 | surface tension was determined with
**aqueous CaCl₂ solution (42.7% by weight of CaCl₂) or
*water It transpired that the modified membrane has a distinctly increased surface tension compared with the reference membranes, especially after 72 hour Soxhlet extraction with ethanol. Therefore, the starting membrane becomes permanently hydrophilicized by the electron beam induced modification after impregnation with an aqueous solution of Pluriol® 4000 without prior decomposition of the starting membrane occurring. Moreover, the unspecific protein binding of the membrane is dramatically reduced as a result of this modification and the surface tension is at the same time dramatically increased. The flux is reduced by the modification by 35% and 39% versus the starting membrane and the reference membrane, respectively.

3) Hydroxyethylcellulose 4000

The starting membrane of type 15407 was impregnated with a solution of hydroxyethylcellulose, viscosity 4000 µPa*s, as 1 percent by weight solution in water at 20° C., in reverse osmosis (RO) water that contained 0.5 percent by weight of the homopolymer. The membrane was modified as prescribed above under "General description of procedure" (dose 75 kGy (corresponds to 75 kJ/kg)) and had the properties recited in table 3 after extraction with isopropanol (IPA) and water. The reference membrane was merely extracted with IPA and water without having been treated beforehand with impregnating solution and/or electron beam radiation; a further reference membrane was irradiated with water after impregnation, and subsequently extracted with IPA and water:

TABLE 3

| Imprägn. | Dose/ kGy | TASZ/ s | Protein binding/ ($\mu$g/cm$^2$) | Permeability/ (l/(h * m$^2$ * bar) | Surface tension/ (mN/m) | TASZ Soxhlet/s |
|---|---|---|---|---|---|---|
| water | 75 | 13 ± 1 | 8.2 | 1.29 * 10$^4$ | 72* | 29 ± 3 |
| none | 0 | 24 ± 2 | 9 ± 1 | 1.20 * 10$^4$ | 72* | >300 |
| hydroxy-ethyl-cellulose, 0.5% | 200 | 7.0 | 10 | 1.08 * 10$^4$ | 76** | 7 | surface tension was determined with
**aqueous CaCl$_2$ solution (12.3% by weight of CaCl$_2$) or
*water It transpired that the modified membrane has a distinctly reduced TASZ compared with the reference membranes, especially after 72 hour Soxhlet extraction with ethanol. Therefore, the starting membrane becomes permanently hydrophilicized by the electron beam induced modification after impregnation with an aqueous solution of hydroxyethylcellulose 4000 without prior decomposition of the starting membrane occurring. Moreover, the surface tension of the membrane is slightly increased. The flux is only minimally altered by the modification. The protein binding of the inventive membranes is comparable to the protein binding of the reference membranes.

4) Dextran 4 MW 4000-6000 g/mol

The 15407 type starting membrane was impregnated with a solution of Dextran 4, molecular weight 4000-6000 g/mol, from Serva Feinbiochemika GmbH & Co. KG in reverse osmosis (RO) water that contained 2.0 weight percent of the homopolymer. The membrane was modified as prescribed above under "General description of procedure" (dose 340 kGy (corresponds to 340 kJ/kg)) and had the properties recited in table 4 after extraction with isopropanol (IPA) and water. The reference membrane was merely extracted with IPA and water without having been treated beforehand with impregnating solution and/or electron beam radiation; a further reference membrane was irradiated with water after impregnation, and subsequently extracted with IPA and water.

TABLE 4

| Imprägn. | Dose/ kGy | TASZ/ s | Protein binding/ ($\mu$g/cm$^2$) | Permeability/ (l/(h * m$^2$ * bar) | Surface tension/ (mN/m) | TASZ Soxhlet/s |
|---|---|---|---|---|---|---|
| water | 75 | 13 ± 1 | 8.2 | 1.29 * 10$^4$ | 72* | 29 ± 3 |
| none | 0 | 24 ± 2 | 9 ± 1 | 1.20 * 10$^4$ | 72* | >300 |
| 2 wt % Dextran 4 | 340 | 10 | 16 ± 3 | 0.87 * 10$^4$ | 78** | 9 | surface tension was determined with
**aqueous CaCl$_2$ solution (16.3% by weight of CaCl$_2$) or
*water It transpired that the modified membrane has a reduced TASZ compared with the reference membrane, which has not been impregnated, especially after 72 hour Soxhlet extraction with ethanol. Therefore, the starting membrane becomes permanently hydrophilicized by the electron beam induced modification after impregnation with an aqueous solution of dextran without a prior decomposition of the starting membrane occurring. Moreover, the surface tension of the membrane is slightly increased. The flux is reduced by 28% or 33% by the modification.

5) Pluronics® PE3500

The 15407 type starting membrane was impregnated with a solution of Pluronics®—PE3500 from BASF AG in reverse osmosis (RO) water that contained 0.5 weight percent of the copolymer. The membrane was modified as described above under "General description of procedure" (dose 75 kGy (corresponds to 75 kJ/kg)) and had the properties recited in table 5 after extraction with isopropanol (IPA) and water. The reference membrane was merely extracted with IPA and water without having been treated beforehand with impregnating solution and/or electron beam radiation; a further reference membrane was irradiated with water after impregnation, and subsequently extracted with IPA and water:

TABLE 5

| Imprägn. | Dose/ kGy | TASZ/ s | Protein binding/ ($\mu$g/cm$^2$) | Throughflow/ (s/100 ml) | Surface tension/ (mN/m) | TASZ Soxhlet/s |
|---|---|---|---|---|---|---|
| water | 75 | 13 ± 1 | 8.2 | 1.29 * 10$^4$ | 72* | 29 ± 3 |
| none | 0 | 24 ± 2 | 9 ± 1 | 1.20 * 10$^4$ | 72* | >300 |
| 0.5 wt % | 75 | 6.9 | 3.4 | 1.15 * 10$^4$ | 74** | 18 | surface tension was determined with
**aqueous CaCl$_2$ solution (7.5% by weight of CaCl$_2$) or
*water It transpired that the modified membrane has a distinctly reduced TASZ compared with the reference membrane, especially after 72 hour Soxhlet extraction with ethanol. Therefore, the starting membrane becomes permanently hydrophilicized by the electron beam induced modification after impregnation with an aqueous solution of Pluronics® PE 3500 without a prior decomposition of the starting membrane occurring. Moreover, the unspecific protein binding of the membrane is distinctly reduced by this modification. The flux is only minimally changed by the modification.

6) Novec®

The type 15407 polyether sulfone starting membrane was impregnated with a preparation marketed by 3M AG as Novec® EGC-1700 "Electronic fluid", a solution of a perfluorinated aliphatic polymer in methyl nonafluoro(iso)butyl ethers, which has a solids content of 2%. The membrane was impregnated with Novec® EGC-1700 "Electronic fluid" and modified with a radiative dose of 150 kGy and had the properties recited in table 6 after extraction with IPA and water. The reference membrane was impregnated with Novec® EGC-1700 "Electronic fluid", but not irradiated and was extracted similarly to the modified membrane.

TABLE 6

| Imprägn. | Dose/ kGy | TASZ/ s | Protein binding/ ($\mu$g/cm$^2$) | Throughflow/ (s/100 ml) | Surface tension/ (mN/m) | TASZ Soxhlet/s |
|---|---|---|---|---|---|---|
| water | 150 | 13 ± 1 | 15.2 | 1.29 * 104 | 72* | 29 ± 3 |
| Novec® EGO-1700 | 0 | 13 ± 1 | 8.2 | 1.31 * 104 | 72* | >300 |
| Novec® EGO-1700 | 150 | >300 | >80 | 1.05 * 104 | 21** | >300 | surface tension was determined with
**isopropanol or
*water

The 15407 type hydrophilic starting membrane becomes hydrophobic as a result of the combination of irradiation and impregnation with Novec® EGO-1700 and has a distinctly reduced surface tension of 21 mN/m, which is neither achieved by impregnation with Novec® EGO-1700 without irradiation nor by impregnation with water and subsequent irradiation. Therefore, the starting membrane becomes permanently hydrophobicized by the electron beam induced modification after impregnation with Novec® EGO-1700 without any prior decomposition of the starting membrane occurring.

7) Hydroxyethylcellulose on Polysulfone

The 14907 type hydrophobic starting membrane was impregnated with a solution of hydroxyethylcellulose, viscosity 4000 µPa·s, in reverse osmosis (RO) water that contained 1.0 weight percent of the homopolymer. The membrane was modified as prescribed above under "General description of procedure" (dose 100 kGy (corresponds to 100 kJ/kg)) and had the properties recited in table 7 after extraction with isopropanol (IPA) and water. The reference membrane was merely extracted with IPA and water without having been treated beforehand with impregnating solution and/or electron beam radiation; a further reference membrane was irradiated with water after impregnation, and subsequently extracted with IPA and water.

TABLE 7

| Imprägn. | Dose/ kGy | TASZ/ s | Protein binding/ (µg/cm$^2$) | Permeability/ (l/(h * m$^2$ * bar) | Surface tension/ (mN/m) | TASZ Soxhlet/ s |
|---|---|---|---|---|---|---|
| water | 100 | >300 | 83 | 1.37 * 10$^4$ | <70* | <300 |
| none | 0 | >300 | 83 | 1.43 * 10$^4$ | <70* | <300 |
| hydroxy-ethyl-cellulose, 1 wt % | 100 | 7.0 | 24.2 | 1.02 * 10$^4$ | 82** | 6.9 | surface tension was determined with
*ethylene glycol-water mixture in weight ratio of 6:94 or
**with aqueous CaCl$_2$ solution (23.3% by weight of CaCl$_2$)

After modification, the 14907 type hydrophobic starting membrane has hydrophilic properties, surface tension is distinctly increased at 82 mN/m and the membrane wets spontaneously with water. The membrane was permanently hydrophilicized without membrane decomposition due to the irradiation having occurred.

8) PVP-VA on Polysulfone

The 14907 type hydrophobic starting membrane was impregnated with a solution of polyvinylpyrrolidone-vinyl acetate (PVP-VA) available from BASF SE under the trade name Luviskol® VA 37 E, in reverse osmosis (RO) water that contained 2.0 weight percent of the copolymer. The membrane was modified as prescribed above under "General description of procedure" (dose 50 kGy (corresponds to 50 kJ/kg)) and had the properties recited in table 8 after extraction with isopropanol (IPA) and water. The reference membrane was merely extracted with IPA and water without having been treated beforehand with impregnating solution and/or electron beam radiation; a further reference membrane was irradiated with water after impregnation, and subsequently extracted with IPA and water.

TABLE 8

| Imprägn. | Dose/ kGy | TASZ/ s | Protein binding/ (µg/cm$^2$) | Permeability/ (l/(h * m$^2$ * bar) | Surface tension/ (mN/m) | TASZ Soxhlet/ s |
|---|---|---|---|---|---|---|
| water | 50 | >300 | 83 | 1.40 * 10$^4$ | <70* | >300 |
| none | 0 | >300 | 83 | 1.38 * 10$^4$ | <70* | >300 |
| PVP-VA, 2% | 50 | 16.2 | 4.7 | 5.2 * 10$^3$ | 80** | 36.3 | surface tension was determined with
* ethylene glycol-water mixture in weight ratio of 6:94 or
**with aqueous CaCl$_2$ solution (20.0% by weight of CaCl$_2$)

The hydrophobic starting membrane wets spontaneously with water after impregnation and irradiation, surface tension is distinctly increased at 80 mN/m without any decomposition of the membrane occurring beforehand.

9) Polyethyloxazoline on Polyether Sulfone Membrane of Type 15428

The 15428 type starting membrane was impregnated with a solution of polyethyloxazoline in reverse osmosis water that contained 5 weight percent of the homopolymer. The membrane was modified as prescribed above under "General description of procedure" (dose 100 kGy (corresponds to 100 kJ/kg)) and had the properties recited in table 9 after extraction with isopropanol (IPA) and water. The reference membrane was merely extracted with IPA and water without having been treated beforehand with impregnating solution and/or electron beam radiation; a further reference membrane was irradiated with water after impregnation, and subsequently extracted with IPA and water.

TABLE 9

| Imprägn. | Dose/ kGy | TASZ/ s | Protein binding/ (µg/cm$^2$) | Permeability/ (l/(h * m$^2$ * bar) | Surface tension/ (mN/m) | TASZ Soxhlet/s |
|---|---|---|---|---|---|---|
| water | 100 | 144 | 30 | 225 | 74** | 145 |
| none | 0 | 113.2 | 24 | 250 | 72* | 155 |
| Polyethyl-oxazoline, 3% | 100 | 103 | 4.2 | 98 | 78** | 150 | surface tension was determined with
**aqueous CaCl$_2$ solution (16.3% by weight) or
*with water The modified membrane has an increased surface tension compared with the reference membranes. Therefore, the starting membrane becomes permanently hydrophilicized by the electron beam induced modification after impregnation with an aqueous solution of polyethyloxazoline without any prior decomposition of the starting membrane occurring. Moreover, the unspecific protein binding of the membrane is distinctly reduced by this modification.

10) Polyethylene Glycol 4000 on a Membrane of Type 15404

The 15404 type starting membrane was impregnated with a solution of Pluriol® 4000, obtainable from BASF (polyethylene glycol having an average molar mass of 4000 g/mol) in reverse osmosis (RO) water that contained 1.0 percent by weight of the homopolymer. The membrane was modified as prescribed above under "General description of procedure" (dose 75 kGy (corresponds to 75 kJ/kg)) and had the properties recited in table 10 after extraction with isopropanol (IPA) and water. The reference membrane was merely extracted with IPA and water without having been treated beforehand with impregnating solution and/or electron beam radiation; a further reference membrane was irradiated with water after impregnation, and subsequently extracted with IPA and water:

TABLE 10

| Imprägn. | Dose/ kGy | TASZ/ s | Protein binding/ (µg/cm$^2$) | Perme-ability/(l/ (h * m$^2$ * bar) | Surface tension/ (mN/m) | TASZ Soxhlet/ s |
|---|---|---|---|---|---|---|
| water | 75 | 4 | 9.0 | 6.13 * 10$^4$ | 72* | 19 ± 6 |
| none | 0 | 2.8 | 1.4 | 5.96 * 10$^4$ | 72* | >300 |
| Pluriol ® 4000, 1% | 75 | 2.5 | 3.6 | 6.05 * 10$^4$ | 95** | 4 | surface tension was determined with
**aqueous CaCl$_2$ solution (42.7% by weight) or
*with water The membrane modified according to the present invention has a distinctly increased surface tension compared with the reference membranes, especially after 72 hour Soxhlet extraction with ethanol. Therefore, the starting membrane becomes permanently hydrophilicized by the electron beam induced modification after impregnation with an aqueous solution of Pluriol® 4000 without any prior decomposition of the starting membrane occurring. Moreover, the surface tension is at the same time dramatically increased. The flux is not significantly reduced by the modification compared with the starting or reference membrane.

What is claimed is:

1. A method for producing a microporous membrane filter on whose surface an electron beam radiation crosslinked polymer is fixed, said method comprising the steps of:
   a) providing a microporous starting membrane having outer surfaces and pores with inner surfaces extending between the outer surfaces of the membrane and having a microporous starting membrane permeability,
   b) impregnating the membrane with an impregnating solution consisting essentially of a solvent and 0.01 to 20 weight percent of a polymer dissolved or dispersed therein to provide an impregnated membrane that has the solvent and the polymer on the pore inside wall faces and on the outer surfaces of the membrane, the polymer being an organic substance with an average molecular weight of at least 500 g/mol being selected from the group consisting of polyethylene glycol, perfluorinated hydrocarbons, polyethylene oxide (PEO), polypropylene oxide (PPO), hydroxyethylcellulose, hydroxymethylcellulose, and mixtures thereof; and
   c) irradiating the impregnated membrane with electron beam radiation using a dose in the range from 1 to 300 kGy to provide a crosslinked reaction product constituting a three-dimensional network formed of the microporous starting membrane and the polymer without any decomposition of the microporous starting membrane;
   wherein the microporous starting membrane permeability is not reduced by more than 10% by fixing the electron beam radiation crosslinked polymer thereto; and
   wherein the crosslinked reaction product includes the polymer lining all surfaces of the starting membrane to define a coherent network.

2. The method of claim 1 wherein the method prior to said step b) of impregnating further comprises the step of:
   d) pretreating the microporous starting membrane with a prewetting medium.

3. The method of claim 2 wherein the prewetting medium is selected from the group consisting of alcohols, ketones and combinations thereof.

4. The method of claim 1 further comprising, after irradiating the impregnated membrane with electron beam radiation:
   e) extracting uncrosslinked polymer with an extractant to provide an extracted membrane, and then
   f) drying the extracted membrane.

5. The method of claim 4 wherein the extractant is selected from the group consisting of water, alcohols, ketones and combinations thereof.

6. The method of claim 4 wherein the extracted membrane is dried at a temperature in the range from 60 to 190° C. for a period ranging from 6 seconds to 120 minutes.

7. A method for producing a microporous membrane filter on whose surface an electron beam radiation crosslinked polymer is fixed, said method comprising the steps of:
   a) providing a microporous starting membrane having outer surfaces and pores with inner surfaces extending between the outer surfaces of the membrane and having a microporous starting membrane permeability;
   b) pretreating the microporous starting membrane with a wetting liquid selected from the group consisting of alcohols, ketones and combinations thereof;
   c) directly exchanging the wetting liquid for an impregnating solution consisting of a solvent and 0.01 to 20 weight percent of a polymer dissolved or dispersed therein to provide an impregnated membrane that has the solvent and the polymer in the pores and on the outer surfaces of the membrane, the polymer being an organic substance with an average molecular weight of at least 500 g/mol being selected from the group consisting of perfluorinated hydrocarbons, polyethylene oxide (PEO), polypropylene oxide (PPO), hydroxyethylcellulose, hydroxymethylcellulose, and mixtures thereof;
   d) removing an excess of the impregnating solution from the outer surface of the membrane; and
   e) irradiating the impregnated membrane with electron beam radiation using a dose in the range from 1 to 300 kGy to provide a crosslinked reaction product constituting a three-dimensional network formed of the microporous starting membrane and the polymer without any decomposition of the microporous starting membrane;
   wherein the microporous starting membrane permeability is not reduced by more than 10% by fixing the electron beam radiation crosslinked polymer thereto.

8. The method of claim 7 wherein step b) utilizes a solvent selected from the group consisting of water, alcohols, ketones, hydrofluoroethers and mixtures thereof.

9. The method of claim 8 wherein step b) utilizes water or a mixture of water and butanol as solvent.

10. The method of claim 7 wherein the microporous starting membrane consists of a material selected from the group consisting of polysulfone, polyether sulfone, cellulose acetate, cellulose nitrate, polyvinylidene fluoride, polypropene, polyethylene, polytetrafluoroethylene, polyamide, copolymers thereof and mixtures thereof.

11. A method for producing a microporous membrane filter on whose surface an electron beam radiation crosslinked polymer is fixed, said method comprising the steps of:
   a) providing a microporous starting membrane having outer surfaces and pores with inner surfaces extending between the outer surfaces of the membrane and having a microporous starting membrane permeability,
   b) impregnating the membrane with an impregnating solution consisting essentially of a solvent and 0.01 to 20 weight percent of a polymer dissolved or dispersed therein,
   wherein the impregnating solution is free of monomers and crosslinking agents;
   thereby providing an impregnated membrane that has the solvent and the polymer in the pores and on the outer surfaces of the membrane, the polymer being an organic substance with an average molecular weight of at least 500 g/mol being selected from the group consisting of perfluorinated hydrocarbons, polyethylene oxide (PEO), polypropylene oxide (PPO), hydroxyethylcellulose, hydroxymethylcellulose, and mixtures thereof; and
   c) irradiating the impregnated membrane with electron beam radiation using a dose in the range from 1 to 300 kGy to provide a crosslinked reaction product constituting a three-dimensional network formed of the microporous starting membrane and the polymer without any decomposition of the microporous starting membrane;

d) treating the crosslinked reaction product with an extractant that dissolves unconverted polymer, crosslinked polymer that is not fixed on the membrane and solvent residues from the impregnating step so that the crosslinked reaction product is free of extractable components left over from the impregnating solution;

wherein the microporous starting membrane permeability is not reduced by more than 10% by fixing the electron beam radiation crosslinked polymer thereto.

12. The method of claim 1, wherein the polymer dissolved or dispersed in the solvent to form the impregnating solution is a non-derivatized polymer.

13. The method of claim 1, wherein the method is carried out so that the polymer dissolved or dispersed in the solvent to form the impregnating solution is not derivatized.

14. The method of claim 7, wherein the polymer dissolved or dispersed in the solvent to form the impregnating solution is a non-derivatized polymer.

15. The method of claim 7, wherein the method is carried out so that the polymer dissolved or dispersed in the solvent to form the impregnating solution is not derivatized.

16. The method of claim 11, wherein the polymer dissolved or dispersed in the solvent to form the impregnating solution is a non-derivatized polymer.

17. The method of claim 11, wherein the method is carried out so that the polymer dissolved or dispersed in the solvent to form the impregnating solution is not derivatized.

* * * * *